INVENTORS,
STANLEY V. PUIDOKAS AND
ALBERT LATTA
BY Carl J. Barbee
ATTORNEY

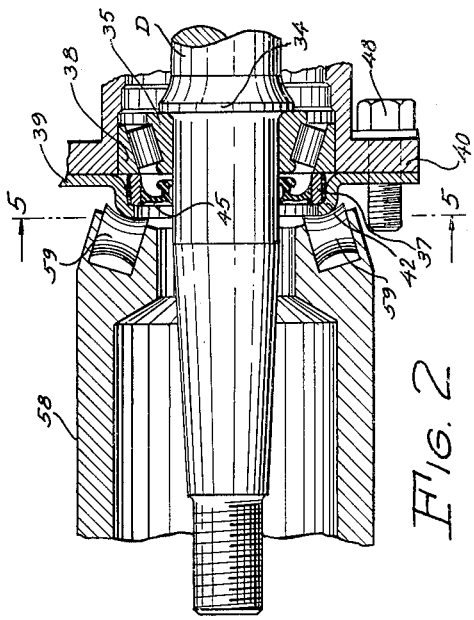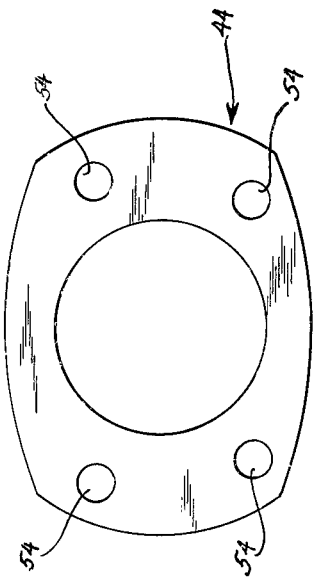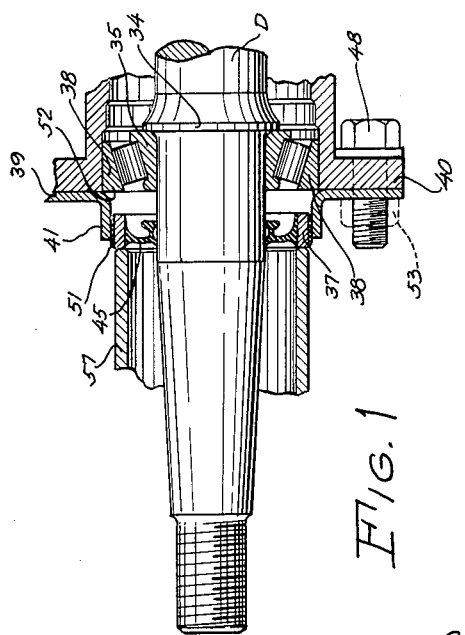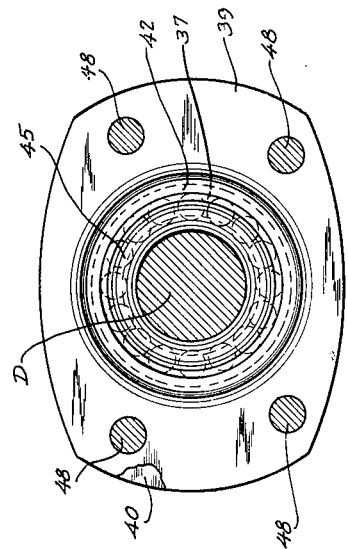
INVENTORS,
STANLEY V. PUIDOKAS AND
ALBERT LATTA
BY
ATTORNEY Nov. 30, 1965   S. V. PUIDOKAS ETAL   3,220,104
METHOD OF ASSEMBLING AN AXLE ASSEMBLY
Filed April 23, 1965   3 Sheets-Sheet 2

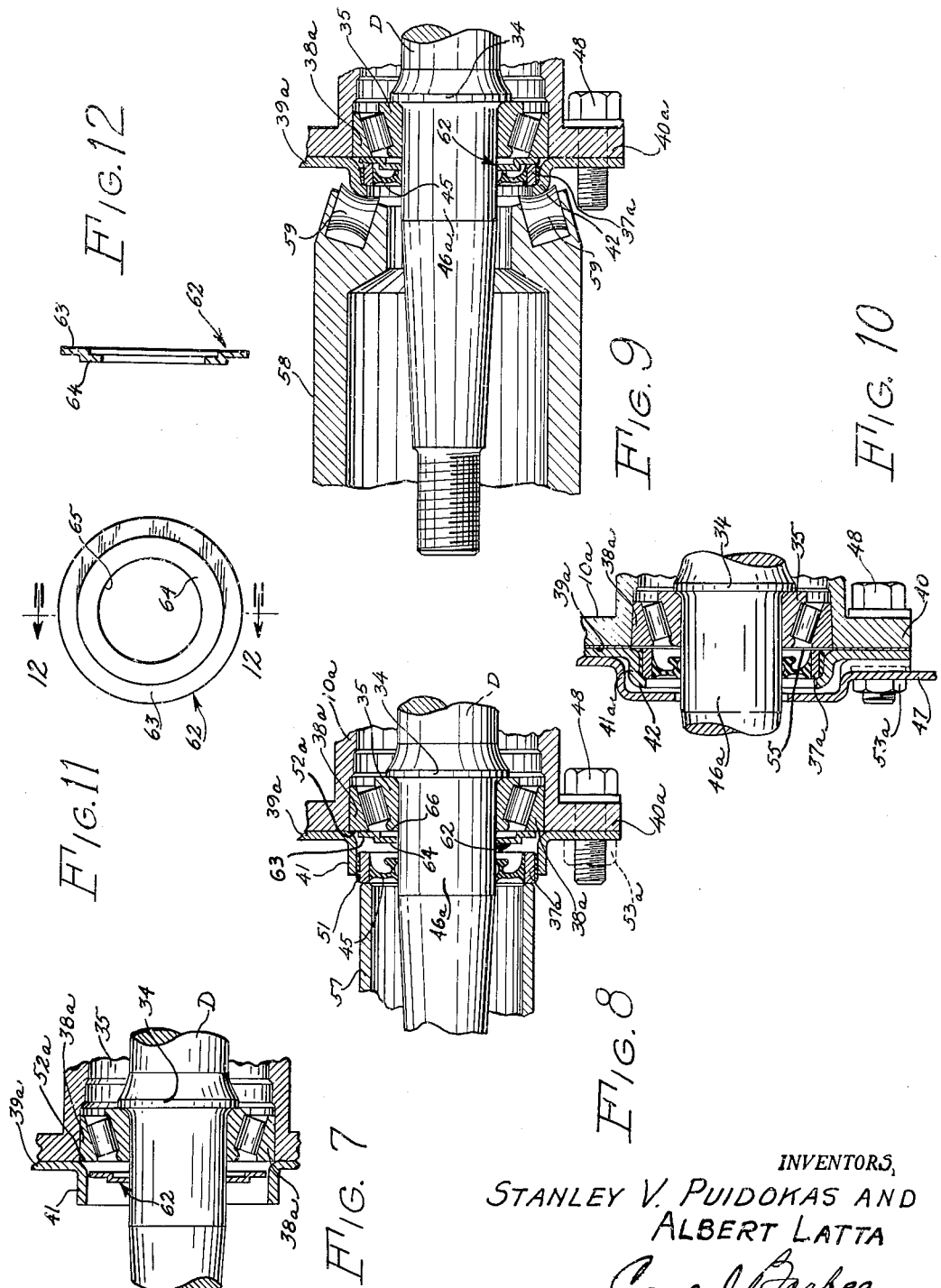

United States Patent Office

3,220,104
Patented Nov. 30, 1965

3,220,104
METHOD OF ASSEMBLING AN AXLE ASSEMBLY
Stanley V. Puidokas and Albert Latta, Kenosha, Wis., assignors to American Motors Corporation, Kenosha, Wis., a corporation of Maryland
Filed Apr. 23, 1965, Ser. No. 450,430
3 Claims. (Cl. 29—434)

This application is a continuation-in-part of co-pending application of Stanley V. Puidokas, Serial No. 252,891, filed January 21, 1963, for rear axle assembly.

The invention relates to the axle assembly of a vehicle and the method of effecting such assembly.

The principal object is to provide a method of assembling an axle assembly wherein uniform end play is assured in successive assemblies.

Another object is to provide a method of assembling to assure uniform end play in an axle assembly wherein a shim of uniform thickness is employed in each assembly.

Another object is to provide a method of assembly wherein uniform end play is assured without the use of permanent shims.

Other objects and advantages of the invention will be apparent from the ensuing specification and appended drawings in which:

FIGURE 1 is a fragmentary detail sectional view of one end of the axle assembly showing one of the steps in the method of effecting assembly.

FIGURE 2 is a fragmentary detail sectional view showing a further step in effecting assembly.

FIGURE 5 is an end view taken on the line 5—5 of FIGURE 2.

FIGURE 6 is a detail view of the permanent uniform type of shim which determines axle end play.

FIGURE 7 is a fragmentary detail sectional view similar to FIGURE 1 and showing one step of a modified form of method of assembly.

FIGURE 8 is a fragmentary detail sectional view showing another step in the modified method of assembly.

FIGURE 9 is a fragmentary sectional detail view showing a further step in the modified method of assembly.

FIGURE 10 is an enlarged fragmentary sectional detail view of a portion of the finished product resulting from the modified method of assembly of FIGURES 7, 8 and 9.

FIGURE 11 is a detail plan view of a master shim employed with the modified method of assembly.

FIGURE 12 is a sectional view taken on the line 12—12 of FIGURE 11.

The axle assembly, in general, includes a differential housing A with conventional gearing B contained therein for driving the left and right axle shafts C and D respectively. The outer ends of each of the axle shafts include the bearing and seal assemblies E and F and the wheel hubs G and H are removably anchored to the outer ends of the respective axle shafts.

In an axle assembly, as hereinbefore generally described, it is necessary to provide for axial end play in the overall assembly and such end play should be in the range of .004″ to .008″ with a desired clearance being .006″. An explanation concerning end play will be set forth more fully hereinafter.

Figure 3:
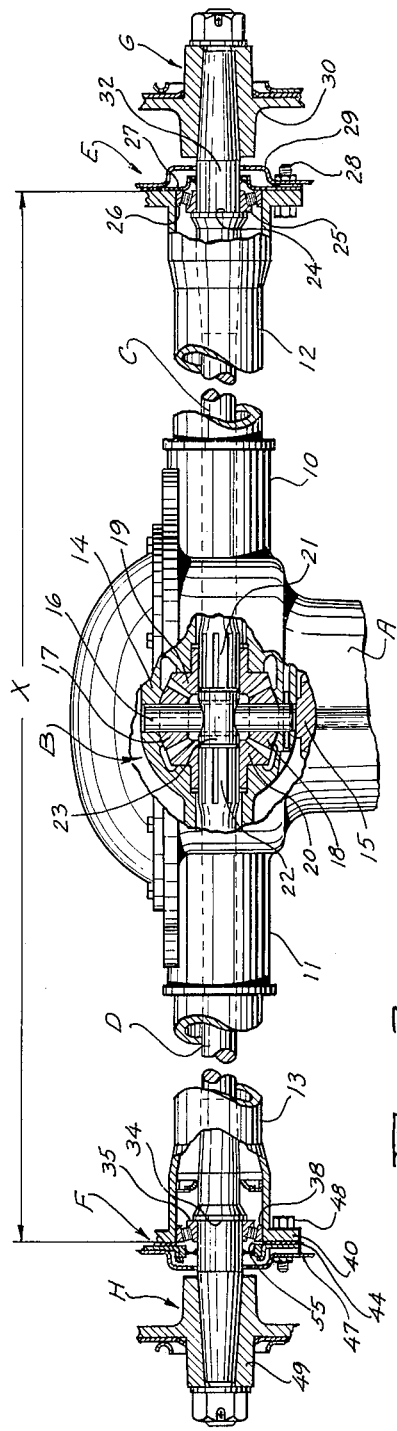
FIGURE 3 is a fragmentary sectional plan view of the completed axle assembly.

Referring to FIGURE 3, the differential housing is provided at either side with outwardly extending tubular extensions 10 and 11 into which the inner ends of the axle tubes 12 and 13 are telescopically received. The axle tubes are rigidly anchored within the differential housing extensions as by means of welding and the dimension X (from one end face of one axle tube to the other end face of the other axle tube) is rather closely held since it is involved in the ultimate end play.

The differential gearing may be of conventional construction including a ring gear 14 having its teeth (not shown) meshing with the teeth on the pinion gear 15 which is the driving gear for the entire axle assembly. The drive shaft which actuates the pinion gear is not shown since it forms no part of the invention.

A pin 16 is anchored to the ring gear and carries the gears 17 and 18 which mesh with the axle shaft gears 19 and 20. The splined ends 21 and 22 of the axle shafts are received within the complementary grooves in the gears 19 and 20. The inner end of each axle shaft abuts against the opposite ends of a thrust block 23 which has a diametric slot therein through which the pin 16 projects. Viewing FIGURE 3, it will be noted that the slot in the thrust block is elongated slightly (as indicated by dotted lines) in a direction axially of the axle shafts to permit a slight axial movement of the thrust block during assembly of the overall axle assembly and during activtion of the end play movement which occurs when the axle assembly is in use. Each axle shaft, in the vicinity of the splined inner ends, is mounted in a bearing (not shown) supported in the differential housing. The foregoing description of the differential housing and gearing identifies a conventional rear axle assembly construction of an automobile.

At the outer end of the axle shaft C, an annular shoulder 24 is formed and the inner race 25 of the tapered roller bearing abuts said shoulder. The outer race 26 is held against axial displacement by the seal retainer 27 which is anchored to the end face of the axle tube as by means of bolts 28. The brake shoe carrying plate 29 (a portion of which only is shown) is likewise anchored to the end of the axle tube by means of the bolts 28. The wheel hub 30 is anchored to the tapered end of the axle shaft in a conventional manner. The seal retainer 27 may be of a conventional design employing the rigid plate portion against which the outer race of the bearing abuts and the central annular elastic portion which encircles the cylindrical area 32 of the axle shaft for preventing escape of lubricants from within the end portion of the axle tube.

At the outer end of the axle shaft D an annular shoulder 34 is formed against which the inner race 35 of the tapered roller bearing abuts. The seal is formed of an annular ring portion 37 of rigid material so that the annular end wall thereof serves as the shoulder or end support against which the outer race 38 of the bearing abuts. The anular ring portion of the seal is of a diameter greater than the inside diameter of the outer bearing race and less than the outside diameter of said race so as to serve as the end support for such bearing race. The seal retainer is in the form of a rigid material having the radially outwardly extending mounting flange portion 39 which is bolted to the end wall 40 of the axle tube 13. The mounting portion of the seal retainer merges with the axially extending central tubular portion 41, the outer end of which is turned radially inwardly at 42 to provide the end support flange against which the annular ring portion 37 of the seal abuts. A suitable shim or gasket 44 is interposed between the end face of the axle tube and the inner face of the mounting portion of the seal retainer for preventing escape of lubricant and for establishing the ultimate end play as will be explained more fully hereinafter. The elastic annular central portion 45 of the seal encircles the area 46 of the axle shaft to prevent the escape of lubricants from the end portion of the axle tube. The brake shoe carrying plate 47 is also anchored to the end of the axle tube by means of the bolts 48. The wheel hub 49 is removably secured to the end of the axle shaft in the same manner as wheel hub 30.

Method of assembly

In the method of assembling the overall axle assembly, the axle shafts are inserted into the axle tubes until the splined ends thereof are received within the differential gear hubs. In event of a rather snug fit of the splines, the outer end of each axle shaft can be tapped with a mallet until each inner end engages the thrust block 23. If the inner bearing races 25 and 35 are not in abutment with the annular shoulders, 24 and 34, then a suitable sleeve can be inserted over the end of each of the shafts into engagement with the ends of the bearing races and then tapped with a mallet to assure that the bearing races are snug against the axle shaft shoulders. The outer bearing race 26 is then inserted in the end of the axle shaft tube 12 and the seal retainer 27 together with the brake shoe carrying plate 29 is anchored to the end of the axle tube by tightening the nuts on the bolts 28. The inner face of the seal retainer can be coated with a very thin coating of elastic material so as to prevent escape of lubricant between the retainer face and the end face of the axle tube. Thus, the end of the axle assembly which involves axle shaft C is completed except for installing the wheel hub 30 in place.

Figure 4:
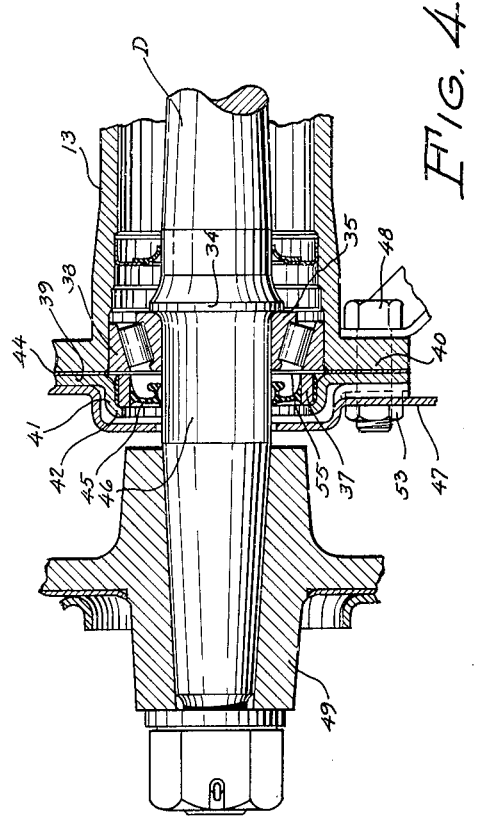
FIGURE 4 is an enlarged fragmentary sectional detail view of a portion of the apparatus of FIGURE 3.

At the opposite end of the axle assembly which involves axle shaft D the outer bearing race 38 is inserted in the end of the axle tube and the seal retainer flange 39 is temporarily anchored to the end of the axle tube as by means of the bolts 48. Then the seal is introduced into the then tubular flange of the seal retainer as indicated in FIGURE 1. The outer circumference of the annular seal ring 37 may have a thin layer 51 of elastic material bonded thereto and the seal ring will have a snug fit when pressed into the seal retainer flange 41 and will prevent escape of lubricant. The seal ring 37 is pushed into the seal retainer flange until it is in engagement with the end wall 52 of the outer bearing race. At this stage, the fit of the seal ring within the seal retainer flange may be sufficiently snug as to hold the outer bearing race 38 in a position in which all of the axially directed end play is taken out of the overall axle assembly. Then the outer end of the retainer flange 41 is turned inwardly as viewed in FIGURE 2 so as to positively lock the seal ring against the outer bearing race. At this stage, all of the axially directed end play is taken out of both of the bearings at the outer ends of the axle shafts and the inner ends of the axle shafts are positively abutting against the opposite ends of the thrust block 23. Then the next step is to unfasten the nuts 53 on bolts 48 and withdraw the seal retainer (together with the seal ring) to permit installation of the desired thickness of shim 44 over the end of the axle. After the shim is installed in place with its bolt holes 54 guided onto the shanks of the bolts 48, then the retainer and sealing ring assembly, together with the brake shoe carrying plate 47, are again fastened to the end of the axle tube by threading nuts 53 onto the shanks of the bolts 48. Thus, the annular end wall of the seal ring will be moved axially outwardly from the end wall of the outer bearing race a distance equal to the thickness of the shim 44 and a uniform amount of axial end play in the overall axle assembly will be established. The preferred amount of end play may be about .006" or about midway between the desired range of .004" to .008". The end play clearance is indicated in FIGURES 3 and 4 by the numeral 55 and is exaggerated for purposes of clarity.

It will be understood that the lengths of the axle shafts, thrust block, seal ring 37 and the locating of the shaft shoulders 24 and 34 will be held sufficiently closely in relation to the dimension X (from end to end of the axle tubes) in order that the spinning of the seal retainer flange 42 can be accomplished to provide the initial zero end play condition desired. Then a uniform thickness of shim can be used on successive axle assemblies.

In the performing of the steps shown in FIGURES 1 and 2, the seal ring 37 can be pushed into the interior of the seal retainer flange by means of a power actuated hollow mandrel 57 engaging and then exerting axial thrust against the end of the seal ring. Then this mandrel can be axially withdrawn so as to clear the end of the axle shaft and permit a second power actuated mandrel 58 to be axially directed over the end of the shaft until the rollers 59 engage the end of the retainer flange 41 to perform the spinning operation necessary to effect the radially inwardly directed locking flange 42. The mandrel 58 would, of course, be rotated to perform the desired spinning operation.

Under some conditions of assembly, it might be desirable to engage the end of the axle shaft D with a power operated driving spindle (not shown herein) in order to effect rotation of the axle shaft while the spinning operation shown in FIGURE 2 is being performed. Beneficial bearing seating might thus be better accomplished.

Referring to FIGURES 1, 2 and 4, it should be noted that the thickness of the elastic coating 51 on the seal ring is exaggerated for purposes of clarity. Also, by accurately controlling the axial length of the seal ring 37, service replacement in the field can be effected without the need of shimming—the original .006" shim being appropriate for the desired end play results when the replacement seal is installed.

Modified method of assembly

Referring to FIGURES 7, 8, 9 and 10, we have shown a modified method of assembly in which resultant end play is accomplished without the need of the permanent shim 44.

In this method of assembly, the steps of assembling the rear axle assembly as shown in FIGURE 3 are the same as hereinbefore described up to the point in which the outer bearing race 38a is inserted into the end of the axle tube 10a. Then a master shim identified generally by the numeral 62 is manually guided onto the cylindrical portion 46a of the axle shaft so as to be adjacent to the end wall 52a of the outer bearing race 38a.

The master shim may be comprised of a circular washer having an annular rim portion 63 which merges with the offset hub portion 64. The central circular opening 65 is of a diameter slightly greater than the outside diameter of shaft portion 46a so that when the washer is installed telescopically thereonto, it will be concentric with the axle shaft and the rim 63 will overlie the circular end wall 52a of the outer bearing race uniformly throughout its circumferential extent. The offset portion 64 can be provided, if necessary, to prevent any contact of the hub portion of the master shim with the end wall 66 of the inner bearing race. The master shim, (or at least the annular rim area which contacts the outer bearing race), is of a predetermined thickness, between .004" and .008", (.006" being a desirable thickness) for establishing the ultimate end play.

Referring to FIGURE 8, the seal retainer 39a is now fastened directly to the end face of axle tube 10a. If the outside diameter of the master shim is slightly less than the inside diameter of the axial tubular portion 41a of the retainer, then the retainer could be bolted to the mounting flange 40a of the tube before the master shim is installed onto the axle shaft.

The seal assembly is then introduced into the then tubular flange 41a of the retainer as shown in FIGURE 8 and then the tool 57 forces the seal ring 37a into tight engagement against the outer face of the rim 63 of the master shim. At this stage the fit of the seal ring within the seal retainer flange may be sufficiently snug as to hold the outer bearing race 37a in a position in which all of the axially directed end play is taken out of the overall axle assembly. Then the outer end of the retainer flange is turned inwardly, as viewed in FIGURE 9, so as to positively lock the seal ring against the master shim. At this stage all of the axially directed end play is taken out of both of the bearings at the outer ends of the axle shafts and the inner ends of the axle shafts are positively abutting against the opposite ends of the thrust block 23.

After the tool 58 is withdrawn, then the nuts 53a are loosened and the retainer and seal assembly is withdrawn from the end of the axle shaft, after which the master shim is also withdrawn and removed from the axle shaft. Then the seal retainer and seal assembly is inserted over the end of the axle shaft and the nuts 53a are again tightened to securely anchor the seal retainer mounting flange 39a with reference to flange 40a of the axle tube. A very thin coating of elastic material may be applied to the end face of the retainer mounting flange to provide a suitable seal for preventing escape of lubricant between such flange face and the end face of the axle tube flange 40a. Such coating is indicated in FIGURE 10—the thickness of same being greatly exaggerated. With the master shim removed, the predetermined spacing, as indicated in FIGURE 10 by the numeral 5 of the end wall 52a of the outer bearing race from the annular end wall of seal ring 37a results, thereby assuring a uniform amount of end play without the need for any permanent shim between the retainer and axle tube. It will be understood in viewing FIGURES 7, 8, 9, 11 and 12 that the thickness of shim 62 is greatly exaggerated for purposes of clarity. It will be understood that the coating on the retainer is very thin and does not interfere with the desired end play.

We claim:

1. In an axle assembly with a hollow differential housing having hollow axle housings extending from either side thereof; with differential gearing housed within the differential housing, the method of assembling axle shafts, bearings and seals within such housings, such method including the steps of
    (1) inserting an axle shaft in each axle housing to establish driving connection with the gearing in the differential housing;
    (2) inserting the inner race of a bearing onto the end of each axle shaft and the outer race of each such bearing within the interiors of the respective axle housings;
    (3) installing a retainer on one axle housing for retaining the bearing and associated axle shaft against axial movement relative to such axle housing;
    (4) temporarily anchoring a second retainer on the other axle housing;
    (5) moving an annular seal into the hollow end of the second retainer until the seal engages the outer race of the bearing adjacent such second retainer;
    (6) moving a mandrel into engagement with the hollow end of the retainer to form a radially directed flange on the retainer for locking the annular seal against the outer race of the bearing and for substantially eliminating axial movement of the bearings and axle shafts relative to the axle housings;
    (7) retracting the second retainer from the associated axle housing;
    (8) installing a shim between the second retainer and associated axle housing; and
    (9) re-anchoring the second retainer to the associated axle housing thereby establishing a pre-determined range of axial movement of the axle shafts relative to the axle housings.

2. In an axle assembly with a hollow differential housing having hollow axle housings extending from either side thereof; with differential gearing housed within the differential housing, the method of assembling axle shafts, bearings and seals within such housings, such method including the steps of
    (1) inserting an axle shaft in each axle housing to establish driving connection with the gearing in the differential housing;
    (2) inserting the inner race of a bearing onto the end of each axle shaft and the outer race of each such bearing within the interiors of the respective axle housings;
    (3) installing a retainer on one axle housing for retaining the bearing and associated axle shaft against axial movement relative to such axle housing;
    (4) temporarily anchoring a second retainer on the other axle housing;
    (5) moving a master shim of pre-determined thickness onto the axle shaft adjacent to the outer face of the outer race of the bearing adjacent the second retainer;
    (6) moving an annular seal into the hollow end of the second retainer until the seal engages the master shim;
    (7) moving a mandrel into engagement with the hollow end of the retainer to form a radially directed flange on the retainer for temporarily locking the annular seal against the master shim and the master shim against the outer race of the bearing and for substantially eliminating axial movement of the bearings and axle shafts relative to the axle housings;
    (8) retracting the second retainer from the associated axle housing;
    (9) retracting the master shim off of the axle shaft; and
    (10) re-anchoring the second retainer to the associated axle housing thereby establishing a pre-determined range of axial movement of the axle shafts relative to the axle housings, as determined by the thickness of the master shim.

3. In an axle assembly with a hollow differential housing having hollow first and second axle housings extending from either side thereof; with differential gearing housed within the differential housing, the method of assembling axle shafts, bearings and seals within such housings, such method including the steps of
    (1) inserting an axle shaft in each axle housing to establish driving connection with the gearing in the differential housing;
    (2) inserting the inner race of a bearing onto the end of each axle shaft and the outer race of each such bearing within the interiors of the respective axle housings;
    (3) installing a retainer on the first axle housing for retaining the bearing and associated axle shaft against axial movement relative to such first axle housing;
    (4) moving a master shim of pre-determined thickness telescopically onto the axle shaft adjacent to the outer face of the outer race of the bearing in the second axle housing;
    (5) temporarily anchoring a second retainer on the second axle housing;
    (6) moving an annular seal into the hollow end of the second retainer until the seal engages the master shim;
    (7) moving a mandrel into engagement with the hollow end of the retainer to form a radially directed flange on the retainer for temporarily locking the annular seal against the master shim and the master shim against the outer race of the bearing and for substantially eliminating axial movement of the bearings and axle shafts relative to the axle housings;
    (8) retracting the second retainer from the associated second axle housing;
    (9) retracting the master shim off of the axle shaft; and
    (10) re-anchoring the second retainer to the associated second axle housing thereby establishing a pre-determined range of axial movement of the axle shafts relative to the axle housings, as determined by the thickness of the master shim.

(References on following page)

References Cited by the Examiner

UNITED STATES PATENTS

| | | | |
|---|---|---|---|
| 1,598,599 | 9/1926 | Buckwalter | 29—434 |
| 2,735,315 | 2/1956 | Zenker | 74—607 |
| 2,762,112 | 9/1956 | Kyler | 29—148.4 |
| 2,908,069 | 10/1956 | Richarson et al. | 29—148.4 |
| 3,025,716 | 3/1962 | Muller | 74—607 |

References Cited by the Applicant

UNITED STATES PATENTS

| | | |
|---|---|---|
| 2,676,040 | 4/1954 | Dalton. |
| 2,866,670 | 12/1958 | Harris et al. |
| 2,982,999 | 5/1961 | Stewart. |

WHITMORE A. WILTZ, *Primary Examiner.*